Patented Jan. 28, 1930

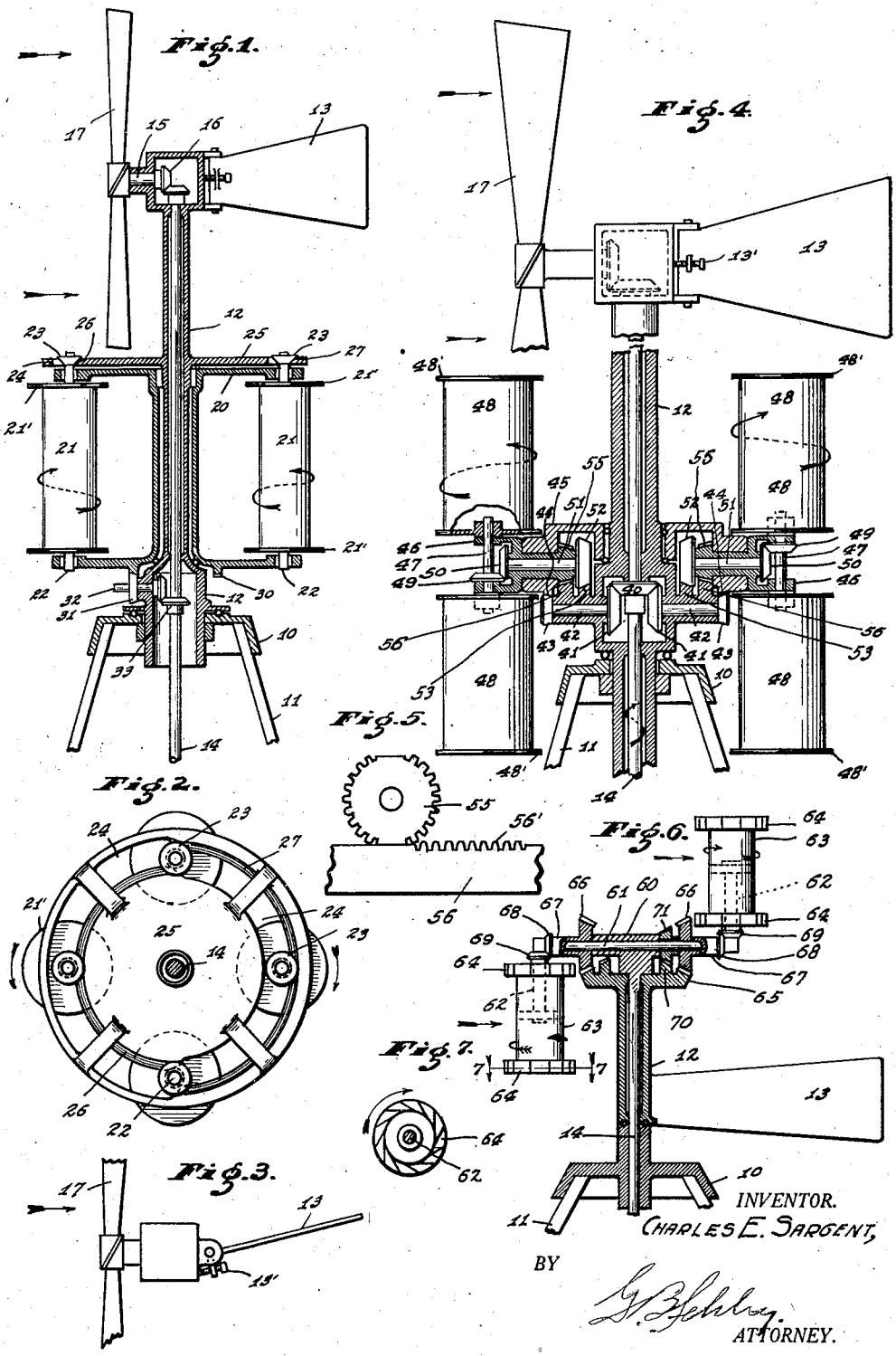

1,744,924

UNITED STATES PATENT OFFICE

CHARLES E. SARGENT, OF ELGIN, ILLINOIS

WIND MOTOR

Application filed April 13, 1925. Serial No. 22,642.

It is the object of my invention to make a wind engine or motor which will employ as a moving force the transverse force exerted on a rotating object when subjected to a moving stream of air. A further object of my invention is to provide in such a wind motor means actuated by the wind for causing a series of cylinders to rotate on an axis transverse to the wind direction in order to produce what is known as the "Magnus effect."

I accomplish the above objects by providing a frame rotatable about a vertical axis, which frame carries one or more cylinders also rotatable on a vertical axis, and I provide wind-driven means for rotating such cylinders so that the wind may operate upon them to cause rotation of the carrying frame.

The accompanying drawing illustrates several devices embodying my invention: Fig. 1 is a central section of one modification of my invention in which the direction of rotation of each cylinder about its axis is changed twice in each revolution in order that the transverse force produced by the wind on each rotating cylinder will tend to rotate the carrying frame in the same direction whether such cylinder is on the windward or leeward side of the frame; Fig. 2 is a plan view of the wind motor shown in Fig. 1; Fig. 3 is a plan view showing the usual form of wind wheel and vane which are mounted above the rotating cylinders; Fig. 4 is a vertical central section through a modification of my device in which a plurality of cylinders are mounted in pairs on the rotating carrying frame, each of such pairs of cylinders being arranged to be inverted twice in each revolution of the carrying frame so as to change the direction of cylinder-rotation relative to the direction of the wind; Fig. 5 is a diagrammatic developed view of the gearing employed for effecting the inversion of the cylinders; Fig. 6 is another modification of my invention in which but two rotating cylinders are employed, each of such cylinders being rotated by a peripheral series of buckets rather than by the ordinary wind wheel employed to produce rotation of the cylinders in the modifications of my invention illustrated in Figs. 1 and 4; and Fig. 7 is a transverse section through the peripheral series of buckets of one of the rotating cylinders shown in Fig. 6.

It is a well known fact that when an object is exposed to a fluid flow and at the same time is rotated on an axis perpendicular to the direction of fluid flow a transverse force is produced tending to move the rotating object across the fluid flow in one direction or the other depending upon the direction of its rotation relative to the direction of fluid flow. A curving golf ball or base ball provides an illustration of the effect produced when a rotating object is subjected to the impact pressure of a fluid. This effect and its causes are well known and has been known for some time as the "Magnus effect." My invention is designed to take advantage of this "Magnus effect" as a source of power in a wind motor.

In all the modifications of my invention illustrated, I provide a base 10 supported at a suitable height by means of any desired frame work 11. Rotatably mounted on a vertical axis on the base 10 is a column 12 provided with a vane 13 for holding the column in a predetermined angular position relative to the direction of the wind. Preferably, the vane 13 is pivotally mounted on the column 12 so as to be angularly adjustable as by means of the screw 13', such angular adjustment being desirable in order that the vane 13 may be set at an angle to the axis of wind wheel rotation to counteract the driving torque. A vertical shaft 14 extending through the column 12 provides means for transmitting power from the wind motor to the lower part of the frame 11.

In the modification of my invention illustrated in Figs. 1 and 2, the upper end of the column 12 is provided with a bearing for the support of a transverse shaft 15 connected at one end by bevel gearing 16 to the shaft 14 and provided at the other end with a wind wheel 17 which may be of any desired form. A cylinder-carrying frame 20 is rotatably mounted on the column 12 and rotatably supports a plurality of cylinders 21 provided with end flanges 21'. Each cylinder 21 is rigidly mounted on a shaft 22 which is rotatable and vertically slidable in suitable bearings in the frame 20; and each of the shafts 22 is provided at its upper end with a conical friction member 23 lying in a circular groove 24 provided in a horizontal plate 25 rigid with the column 12. For 180° of its circumference, the groove 24 has a conical inner face 26 adapted to engage the inner side of the conical friction members 23; and for the other 180° of its circumference, the groove 24 has an outer conical face 27 adapted to engage the outer side of each of the conical friction members 23.

Rigidly mounted on the lower side of the frame 20 is a bevel gear 30 meshing with a second bevel gear 31 carried on a transverse shaft 32. The shaft 32 is rotatably supported in the column 12 and is connected by a bevel gearing 33 with the shaft 14.

It will be evident that when the device as above described is subjected to the wind, the vane 13 will cause the column 12 to rotate about its vertical axis until the wind wheel 17 is presented to the action of the wind. The wind wheel 17 will then operate through the shaft 14, the bevel gearing 33, and the gears 31 and 30 to rotate the cylinder-carrying frame 20 in a counter-clockwise direction (Fig. 2). As the frame 20 rotates, the cylinders 21 will be rotated in one direction or the other depending upon whether their associated friction members 23 are in engagement with the inner groove-face 26 or the outer groove-face 27, with the result that the cylinders on the windward side of the carrying frame 20 will rotate in a counterclockwise direction and those on the leeward side will rotate in a clockwise direction. The action of the wind on the rotating cylinders on the windward (left-hand) side of the rotating frame will tend to move such cylinders downward (Fig. 2) and, the action of the wind on the cylinders on the leeward (right-hand) side will tend to move them upward. Thus, the action of the wind on the rotating cylinders tends to cause rotation of the carrying frame 20 in the same direction as that in which the frame 20 is rotated by the wind wheel 17, and the force exerted on the rotating cylinders by the wind augments materially the power of the wind wheel 17.

The modification of my invention illustrated in Fig. 4 embodies the same wind wheel 17 as that illustrated in Fig. 1, and this wind wheel operates in the same way to cause rotation of the shaft 14. The shaft 14 carries a gear 40 which meshes with one or more gears 41 carried respectively on shafts 42 each of which bears on its outer end a bevel pinion 43, the pinion 43 meshing with a bevel gear 44 carried by a frame 45 rotatably mounted on the column 12. Pivotally mounted on axes radial of the frame 12 are a plurality of yokes 46, each of which supports at its outer end a shaft 47 one each end of which is mounted a rotating cylinder 48 provided with end flanges 48'. Each of the shafts 47 is provided with a bevel gear 49 which meshes with a second bevel gear 50 carried on a shaft 51 extending through the shank of the yoke 46. Mounted on the inner end of each of the shafts 51 is a bevel pinion 52, and the several bevel pinions 52 mesh with a bevel gear 53 supported from the column 12.

On the inner end of each of the yokes 46 there is rigidly mounted a mutilated bevel pinion 55 which meshes with a mutilated bevel gear 56 supported from the column 12. The mutilated gears 55 and 56 are shown developed in Fig. 5 of the drawing. The mutilated gear 56 is provided with two toothed portions 56' which are located diametrically opposite each other in a plane substantially parallel with that of the wind wheel 17.

In the modification illustrated in Fig. 4, the wind wheel 17 drives the shaft 14 which in turn through the gears 40 and 41, shaft 42, pinions 43, and gear 44 rotates the frame 45 in a manner similar to that in which the frame 20 is rotated in the modification illustrated in Figs. 1 and 2. As the frame 45 rotates, the bevel pinions 52 engaging the gear 53 cause rotation of the shafts 51 which through the gears 50 and 49 cause rotation of the cylinders 48 in the directions indicated by the arrows. The interrupted gearing 55—56 causes each yoke 46 to rotate through 180° and thus to be inverted when such yoke in its rotation about the shaft 14 passes that longitudinal plane of such shaft which is parallel to the plane of the wind wheel 17. In rotating, each yoke 46 carries its associated cylinders with it and causes each of those cylinders on the leeward side of the frame to rotate about its own axis in an opposite direction to that in which the cylinders on the windward side of the frame rotate. Thus, as explained in connection with the modifications shown in Figs. 1 and 2, the action of the wind on each cylinder tends to cause rotation of the frame in the same direction whether such cylinder is on the leeward or the windward side of the frame.

In Fig. 6 is illustrated a modfiication somewhat similar to that shown in Fig. 4. In this construction, however, the wind-wheel 17 is omitted and the shaft 14 provided at its upper end with a bearing 60 for the support of a horizontal shaft 61. At each end of the shaft 61 I provide cylinder supports 62 which extend in opposite directions from the shaft 61 and serve to support the rotating cylinders 63 on opposite sides of such shaft. Each cylinder 63 is provided with one or more annular series of buckets 64 the shape of such buckets being clearly shown in Fig. 7. The action of the wind on these buckets causes rotation of each cylinder.

Supported on the upper end of the column 12 is a bevel gear 65 which meshes with two bevel gears 66 carried on sleeves 67 which rotatably surround the shaft 61. The outer end of each sleeve 67 is provided with a bevel gear 68 which meshes with a gear 69 rigid with the cylinder 63. Also supported from the column 12 is a mutilated bevel gear 70 meshing with a mutilated bevel pinion 71, the mutilated gear 70 and the pinion 71 being similar respectively to the mutilated gear 56 and pinion 55 shown in Fig. 5 and embodies in the modification of my invention illustrated in Fig. 4. The mutilated pinion 71 is keyed or otherwise fixed to the shaft 61 and causes said shaft to rotate through 180° and thus to be inverted twice in each revolution of the shaft 14, exactly as the gearing 55—56 causes rotation of the yokes 46 in the modification of my invention shown in Fig. 4.

In operation, the action of the wind on the buckets 64 produces rotation of the two cylinders 63 in the respective directions illustrated by the arrows. This rotation is imparted through the gears 68—69 to the pinions 66 and causes the shaft 14 to rotate about its axis carrying with it the shaft 61, both cylinders, and the attached parts. When the shaft 61 comes into a position in which it extends transversely of the direction of the wind, the mutilated gearing 70—71 causes rotation of the shaft 61 through 180° to cause that cylinder which is passing from the windward to the leeward side of the shaft 14 to assume a position above the shaft 61 and the other cylinder to assume a position below it. Thus, the action of the wind on each rotating cylinder tends to rotate the shaft 14 in the same direction whether such cylinder is on the windward side or leeward side of the shaft 14.

While I have illustrated several modifications of my invention, there are several features common to each form. In each form there is a movable frame which carries a plurality of rotating cylinders; there is means to employ the power generated by the effect of the wind on such rotating cylinders; there is wind-driven means for rotating the cylinders; and there is a means for causing the direction of rotation of each cylinder to change relative to the wind when said cylinder passes from the windward side of the shaft to the leeward side and vice versa.

In addition, I obtain a multiplied or pyramided effect of variations in wind velocity. Thus, an increase in wind velocity would increase the speed of the wind driven means and therefore the speed at which the Magnus elements rotate about their respective axes; and this increased rotational speed of the Magnus elements increases the power derivable therefrom. Further, an additional power increase would result from the direct effect of increased wind velocity on the Magnus elements.

I claim as my invention:—

1. A wind motor, comprising a rotatable frame, one or more rotating cylinders carried by said frame, wind-driven means for rotating said cylinder or cylinders about their respective axes, and means for causing twice in each revolution of said frame a reversal of the direction of rotation of each cylinder relative to the wind direction.

2. A wind motor, comprising a rotatable frame, one or more rotating cylinders carried by said frame, and wind-driven means for rotating said cylinder or cylinders about their respective axes.

3. A wind motor, comprising a movable frame, one or more rotating cylinders carried by said frame, and wind-driven means for rotating said cylinder or cylinders about their respective axes.

4. In combination, a movable frame, one or more rotating cylinders mounted in said frame, wind-driven means for causing said cylinder or cylinders to rotate about their respective axes, and means for employing the force exerted on said rotating cylinders by the wind to augment the power generated by said wind-driven means.

5. A wind motor, comprising a stationary base, a member rotatably mounted on a vertical axis on said base, a vane on said member to fix its angular position relative to the wind direction, a frame rotatable relatively to said member and said base, one or more rotatable cylinders carried by said frame, wind-driven means for rotating said cylinder or cylinders, and means carried by said member for causing twice in each revolution of said frame a reversal of the direction of rotation of each cylinder relative to the wind direction.

6. A wind motor, comprising a base, a frame rotatable relatively to said base, one or more rotatable cylinders carried by said frame, wind driven means for rotating said cylinder or cylinders, and means for causing twice in each revolution of said frame a reversal of the direction of rotation of each cylinder relative to the wind direction.

7. In combination, a movable support, and one or more Magnus elements rotatably mounted in said support, said elements being exposed to the wind and so constructed as to be rotated directly thereby.

8. In combination, one or more Magnus elements, and means associated therewith for obtaining a Magnus effect therefrom by the direct action of the wind.

In witness whereof, I have hereunto set my hand at Elgin, Illinois, this 8th day of April, A. D. one thousand nine hundred and twenty-five.

CHARLES E. SARGENT.